United States Patent [19]

Meeker et al.

[11] Patent Number: 5,427,432
[45] Date of Patent: Jun. 27, 1995

[54] ADJUSTABLE SHIELD FOR CAR SEAT

[75] Inventors: Paul K. Meeker, Hiram; Willaim R. Gibson, Canton, both of Ohio

[73] Assignee: Lisco, Inc., Tampa, Fla.

[21] Appl. No.: 154,685

[22] Filed: Nov. 18, 1993

[51] Int. Cl.6 .............................................. B60N 2/28
[52] U.S. Cl. ............................ 297/256.15; 297/488
[58] Field of Search ................... 297/238, 256.15, 487, 297/488, 250.1

[56] References Cited

U.S. PATENT DOCUMENTS

| | | | |
|---|---|---|---|
| 3,762,768 | 10/1973 | Hyde et al. | 397/488 X |
| 4,230,366 | 10/1980 | Ruda | 297/238 X |
| 4,596,420 | 6/1986 | Vaidya | 297/238 X |
| 4,770,468 | 9/1988 | Shubin | 297/256.15 X |
| 4,900,086 | 2/1990 | Steward | 297/238 |
| 4,986,600 | 1/1991 | Leblanc et al. | 297/238 |

*Primary Examiner*—Peter R. Brown

[57] ABSTRACT

A car seat positionable on the seat of an automobile and retainable in place by an automobile seat belt, the car seat having associated straps for securing the child in place on the car seat and a shield pivotable between a raised position for allowing the entrance or exit of a child from the seat and a lowered position for securing the child in place, the improvement comprising, the shield formed of parallel side arms and a cross bar coupling the outboard ends thereof and with inboard ends having pivot points about an axis of rotation for the shield, the cross bar movable with respect to the pivot point with means to vary the position of the cross bar with respect to the child being supported in the car seat and parallel spring means to retain the cross bar in a preselected position with respect to the child.

2 Claims, 3 Drawing Sheets

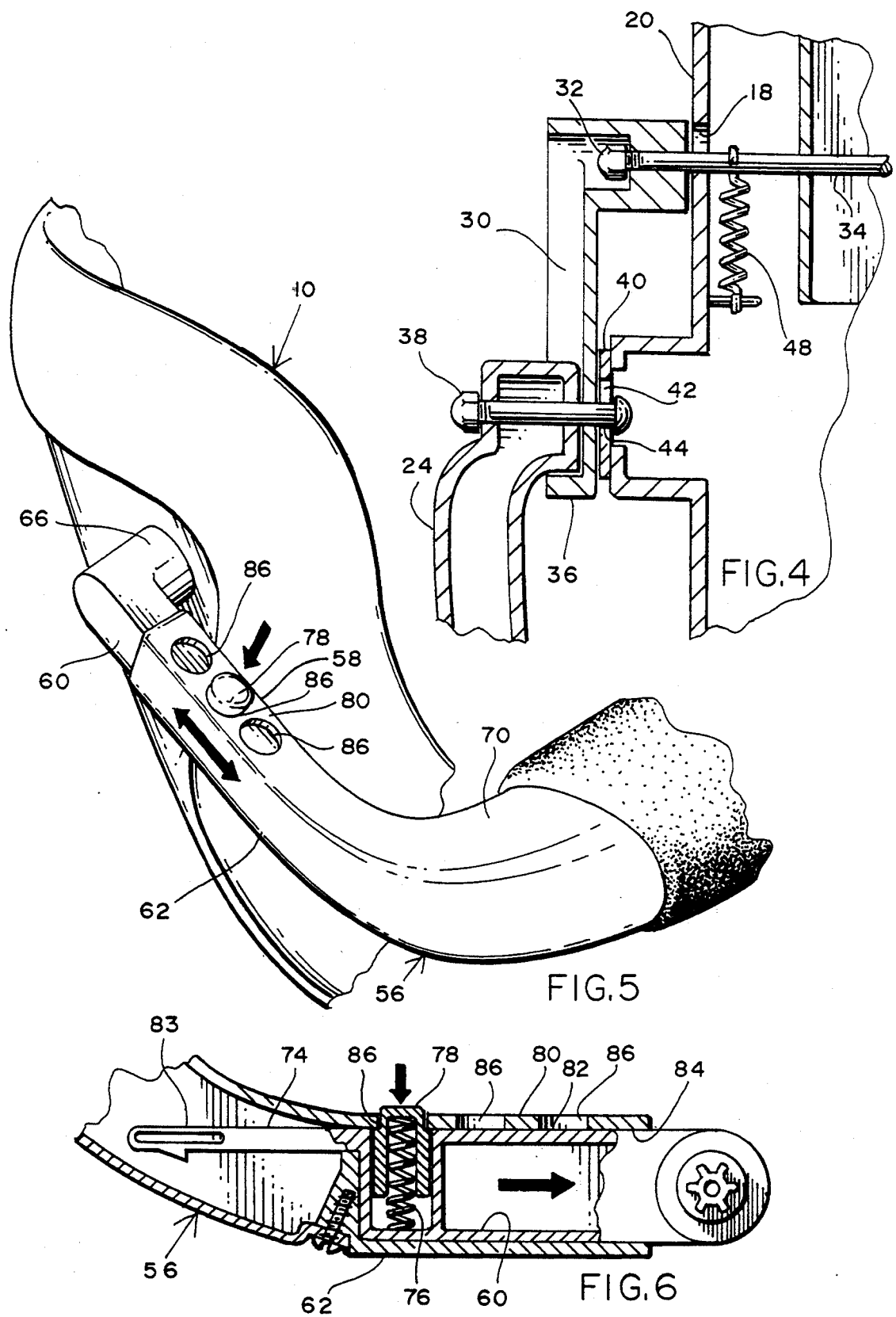

ADJUSTABLE SHIELD FOR CAR SEAT

BACKGROUND OF THE INVENTION

1. Field of the Invention

This invention relates to an adjustable shield for a car seat and, more particularly, to a shield for a child car seat wherein the cross piece thereof may be varied in position with respect to the car seat and held in a preselected position by a spring.

2. Description of the Background Art

Many types of child car seats are known and in wide use today throughout the automotive and child care product industries. The safety of children in moving cars is a continuing concern to parents. Such concern is also shared by governments where safety laws are being passed in increasing numbers of jurisdictions. Because of parental concern and governmental involvement, there has been a large number of technical advances relating to child restraint systems for cars. Such advances are normally directed to increased safety but must be balanced against convenience of use and comfort of the child. If a restraint system is inconvenient to the parent or uncomfortable for the child, there will be a greater tendency to avoid usage regardless of the inherent safety of the system.

Commercially available devices and the background art disclose a wide variety of child restraint systems for use in cars. As a general rule, it seems that the safest devices are the ones which are more uncomfortable to the child user and more complex for the parent to use. Additionally, high cost tends to negate wide usage of restraint systems by reducing the number of initial purchases while uncomfortable or complex mechanisms can also tend to discourage usage. Conversely, more comfortable or convenient restraint systems which are less expensive provide the maximum usage and safety.

A large number of child restraint systems are in commercial use while others are described in the patent literature.

By way of example, note U.S. Pat. No. 4,176,878 to Koutsky which discloses an armrest structure for a vehicle seat. The armrest structure includes a support attached to the side of the vehicle seat, an armrest, and an adjustment structure connecting the support and armrest. The armrest is movable vertically and, in the lowermost travel position, forms an enlargement of the seat portion of the vehicle seat. The armrest is pivotable on the adjustment structure into an upright position.

U.S. Pat. No. 4,674,798 to Oeth et al discloses armrests of a vehicle seat which includes vertical brackets having legs located in vertical guide slots defined by support structure. A cam plate is rotatably mounted between the brackets for movement between a lock position, wherein it establishes a tight frictional engagement between opposed surfaces of the legs and guide slots, and a release position wherein it permits the legs to move freely in the slots.

U.S. Pat. No. 4,657,305 to Meiller discloses a seat comprising a seat portion, a bracket portion which is adjustable to inclination relative to the seat portion, and first and second adjustable armrests at respective sides of the seat, each armrest is connected to a fixing element for fixing it to a mounting element carried on the seat portion. By disposing the mounting element on the seat portion the position of the respective armrest is independent of the inclination of the backrest portion. A connecting element connects the fixing element to the mounting element in such a way as to provide for adjustment in respect of height of the armrest and/or so as to permit pivotal movement of the armrest about an axis extending transversely with respect to the seat.

U.S. Design Pat. No. 287,670 to Kassai discloses an ornamental design of a child's safety seat for an automobile as shown in the various figures and includes linkage mechanisms coupling the safety shield with the seat frame.

U.S. Design Pat. No. 311,822 to Meeker discloses an ornamental design for an infant's safety seat as shown and described in the that design patent.

None of the known commercial devices or prior patents discloses a child car seat coupled with respect to a base with adjustable attachments therebetween, with the adjustment mechanisms on the base out of reach of the supported child. Although many such prior advances are noteworthy to one extent or another, no background patent or known commercial device teaches or suggests the safe, convenient, reliable, and economic child restraint system as disclosed herein.

As illustrated by a greater number of prior patent disclosures and commercial devices, efforts are continuously being made in an attempt to more efficiently design, manufacture and utilize child car seats. No prior effort, however, suggests the inventive combination of component elements arranged and configured as disclosed herein. Prior devices do not provide benefits attendant with the present invention. The present invention achieves its intended purposes, objects and advantages over the prior art through a new, useful and unobvious combination of component elements, through the use of a minimum number of functioning parts, at a reasonable cost to manufacture, and through the utilization of only readily available materials and conventional components.

Therefore, it is an object of the present invention to provide a car seat positionable on the seat of an automobile and retainable in place by an automobile seat belt, the car seat having associated straps for securing the child in place on the car seat and a shield pivotable between a raised position for allowing the entrance or exit of a child from the seat and a lowered position for securing the child in place, the improvement comprising, the shield formed of parallel side arms and a cross bar coupling the outboard ends thereof and with inboard ends having pivot points about an axis of rotation for the shield, the cross bar movable with respect to the pivot point with means to vary the position of the cross bar with respect to the child being supported in the car seat and parallel spring means to retain the cross bar in a preselected position with respect to the child.

It is another object of the invention to improve the safety of children riding in cars.

It is another object of the invention to adjustably couple a child car seat to a base which is, in turn, attachable to a car by a seat belt.

It is another object of the invention to increase the convenience and comfort of a child in a restraint system of a car.

It is another object of the invention to latch a pivotable seat with respect to a base with mechanisms to preclude separation in the event of a crash.

Lastly, it is an object of the present invention to promote the usage of child restraint systems in cars by maximizing safety, comfort and convenience.

The foregoing has outlined some of the more pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a fuller understanding of the invention may be had by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into a restraining system for a child comprising a car seat positionable on the seat of an automobile and retainable in place by an automobile seat belt, the car seat having associated straps for securing the child in place on the car seat and a shield pivotable between a raised position for allowing the entrance or exit of a child from the seat and a lowered position for securing the child in place, the improvement comprising, the shield formed of parallel side arms and a cross bar coupling the outboard ends thereof and with inboard ends having pivot points about an axis of rotation for the shield, the cross bar movable with respect to the pivot point with means to vary the position of the cross bar with respect to the child being supported in the car seat and parallel spring means to retain the cross bar in a preselected position with respect to the child.

The foregoing has outlined rather broadly, the more pertinent and important features of the present invention. The detailed description of the invention that follows is offered so that the present contribution to the art may be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other methods and structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a more succinct understanding of the nature and objects of the invention, reference should be directed to the following description taken in conjunction with the accompanying drawings in which:

FIG. 4 is a sectional view taken through the adjusting mechanisms of FIG. 3.

FIG. 5 is a perspective illustration of the upper portion of an adjustable shield constructed in accordance with an alternate embodiment of the present invention.

FIG. 6 is a sectional view taken centrally through the side arms of the shield of FIG. 5.

Similar reference numerals refer to similar parts throughout the several Figures.

DETAILED DESCRIPTION OF THE PREFERRED EMBODIMENT OF THE INVENTION

Figure 1:
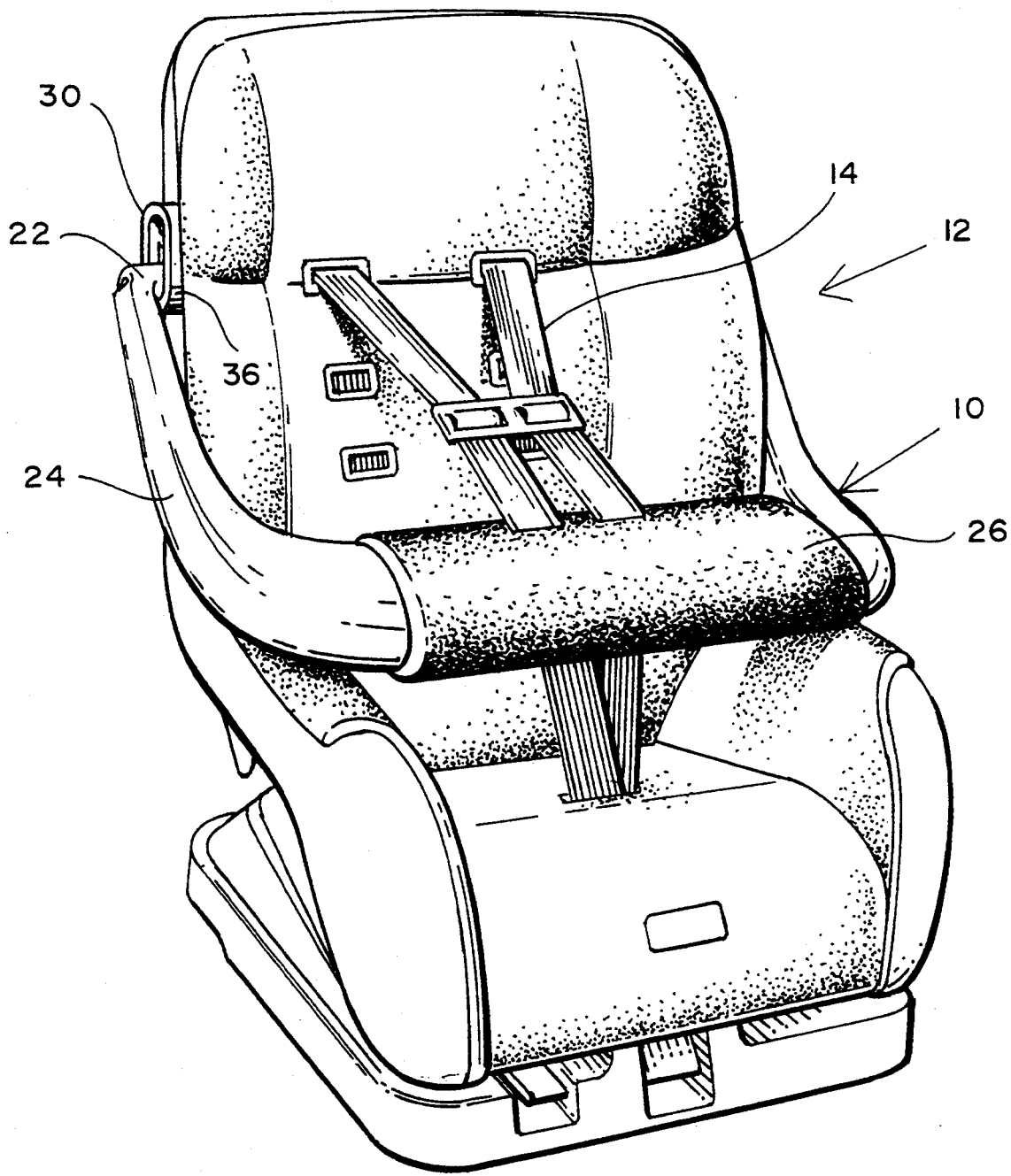
FIG. 1 is a perspective illustration of a child car seat operatively positionable to the seat of an automobile and employing the principles of the present invention.
Figure 2:
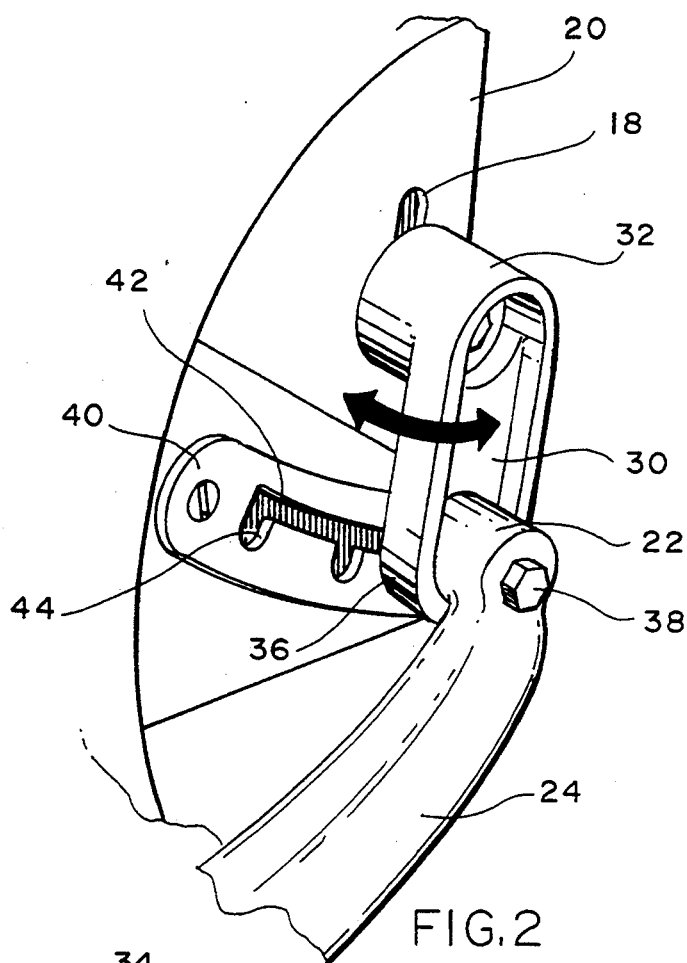
FIG. 2 is an enlarged perspective view of the upper portion of the car shield of FIG. 1 illustrating its technique for adjustment.
Figure 3:
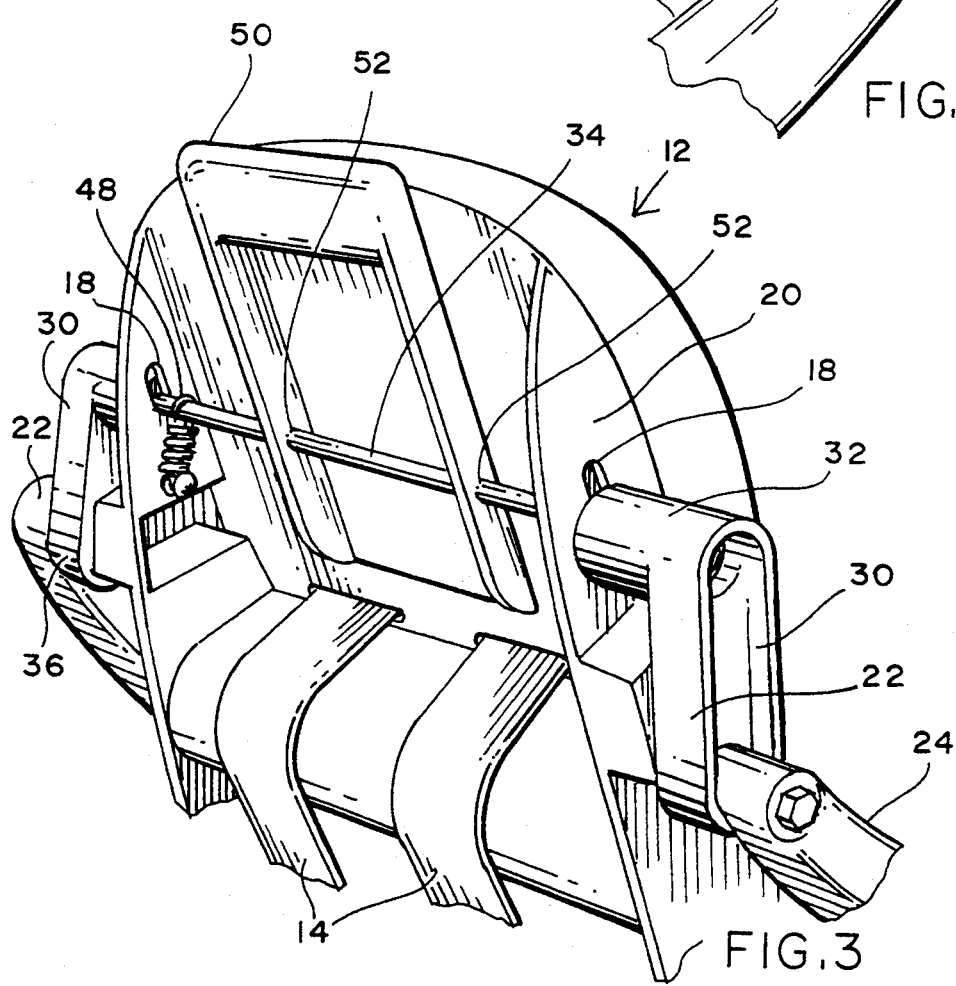
FIG. 3 is a perspective illustration of the rear of the car seat of FIG. 1.

Shown in the Figures, with particular reference to FIG. 1, there is shown an adjustable shield 10 for a child car seat 12.

The car seat is generally conventional and is positionable on the seat of an automobile. It is adapted to be held in place by an automobile seat belt, not shown. The car seat itself has associated straps 14 for securing the child in place on the car seat. Also provided is the pivotable shield 10, pivotable between a raised position for allowing the entrance or exit of a child from the seat and a lowered position for securing the child in place.

The improvement of the present invention is in the adjustability of the shield 10. Such shield comprises adjustment means of two embodiments, each capable of varying the position of the shield as a function of the size of the child and the seat.

In the first embodiment as best seen in FIGS. 1 through 4, generally vertical aperture means 18 formed as vertical slots are located in the sides 20 of the car seat 12 in an upper extent thereof. A shield 10 in a generally U-shaped configuration is formed with inturned free ends 22 which rotatably couple with respect to the pivot links 30. Side arms 24 extend in a parallel orientation from the inturned ends 22 with a shield bar 26 coupling the ends of the side arms remote from the inturned ends.

A pivoting link 30 is employed for each side having an upper end 32 with a link axle 34 extending into and through an associated aperture 18 on both sides of the car seat sides 20. Each link 30 also has a lower end 36 with a lower pin 38 extending into a steel stamping 40 in each side of the seat. Each steel stamping forms an elongated generally horizontal slot 42 having downwardly extending recesses 44. The elongated slots 42 in the steel stampings are radially located from the lower extent of the upper slot 18. The inturned ends 22 of the shield 10 are pivotable with respect to the pivoting link 30 about the pin 38.

The link axle 34 extends behind the car seat from one side of the car seat to the other through apertures 18. Associated springs 48 urge the link axle and an associated handle 50 towards the lower extent of the vertical aperture means. Coupling between the link axle and handle is through handle apertures 52. The handle functions for raising the link axle upwardly within the vertical aperture means which thereby disengages the pin 38 in the lower extent of the pivoting link, from a preselected recess 44 within the steel stamping 40. Such lifted orientation allows the inturned ends 22 and pins 38 to move along slot 42 and to be positioned within a selected recess 44 upon the release of the handle 50 and the action of the spring 48. In this manner, the axis of rotation of the shield may be varied as a function of the size of the child in the seat.

In the second embodiment as seen in FIGS. 5 and 6, the shield 56 is formed with essentially parallel side arms 58. The side arms are each formed of an interior portion 60 and an exterior portion 62. The interior portion 60 has inboard ends 66 extending into apertures in the sides of the car seat 10. This allows for pivotal movement with respect thereto. The outboard ends of the exterior portion extend from one side arm to the other to form a child retaining bar 70.

The outboard ends 74 of the interior portion contain a spring 76 urging a button 78 outwardly from the upper surface 80. The upper surface 82 of the interior portion 60 has an upper planar bearing surface 83 extending outwardly from the button 78. Note FIG. 6.

The exterior portion 62 of the side arms of the shield is formed with an opening 84 at its inboard end for receiving the outboard portion of the interior portion 60. It also has aligned apertures 86 on the upper surface of the exterior portion. The apertures are of a size to receive the exposed end of the buttons 78. The concurrent depression of the buttons on each side arm will allow the exterior portion to be slid axially with respect to the interior portion for positioning a preselected aperture over the button. Such an arrangement functions to thereby vary the position of the shield with respect to a child in the car seat as a function of the child's size for increased safety and comfort.

In both embodiments, parallel springs 48 and 76 are employed and the force of the springs must be overcome by an operator in order to effect the adjustment of the shield.

The present disclosure includes that contained in the appended claims as well as that of the foregoing description. Although this invention has been described in its preferred form with a certain degree of particularity, it should be understood that the present disclosure of the preferred form has been made only by way of example and that numerous changes in the details of construction and combination and arrangement of parts may be resorted to without departing from the spirit and scope of the invention.

Now that the invention has been described,
What is claimed is:

1. A car seat positionable on the seat of an automobile and retained in place by an automobile seat belt, the car seat having associated straps for securing the child in place on the car seat and a shield pivotable between a raised position for allowing the entrance or exit of a child from the seat and a lowered position for securing the child in place, the improvement comprising:

vertically extending upper apertures located in the sides of the car seat in an upper extent thereof, a shield in a generally U-shaped configuration with inturned free ends and with side arms extending in a parallel orientation from the inturned ends with a shield bar coupling the ends of the side arms remote from the inturned ends, pivoting links, each having an upper end receiving a link axle extending through upper apertures of the car seat and having a lower end with a lower pin forming a pivot axis extending into a slot having downwardly extending recesses, the slot having an axis of curvature about the lower extents of the upper apertures, the inturned ends of the shield being pivotable with respect to the pivoting link about said pivot axis and extending from one side of the car seat to the other, a link axle being urged by associated parallel springs into the lower extent of the upper slot and with a handle for raising the link axle and pins of the inturned ends upwardly out of engagement with a preselected recess thereby allowing the pins of the inturned ends to be positioned within a preselected recess upon the release of the handle.

2. A car seat positionable on the seat of an automobile and retainable in place by an automobile seat belt, the car seat having associated straps for securing the child in place on the car seat and a shield pivotable between a raised position for allowing the entrance or exit of a child from the seat and a lowered position for securing the child in place, the improvement comprising:

the shield formed of parallel side arms and a cross bar coupling the outboard ends thereof and with inboard ends having pivot points about an axis of rotation for the shield, the cross bar being movable toward and away from the pivot point with coupling means associated with the side arms to vary the position of the cross bar with respect to the child being supported in the car seat and parallel spring means associated with the side arms to retain the cross bar in a preselected position with respect to the child;

each parallel side arm being coupled to the car seat through a pivoting link with the parallel spring means holding the pivot link downwardly into a predetermined angular orientation with respect to the car seat, the pivot link having a lower end positionable in one of a plurality of recesses in the car seat for establishing the location of the side arms and cross bar with respect to the car seat thereby positioning the axis of rotation between the side arms and pivot links, and, consequently, the cross bar in a predetermined position with respect to a child in the car seat.

* * * * *